United States Patent [19]

Meisner

[11] Patent Number: 4,823,683

[45] Date of Patent: Apr. 25, 1989

[54] POPCORN POPPER

[75] Inventor: Edward H. Meisner, Short Hills, N.J.

[73] Assignee: Packaging Corporation of America, Evanston, Ill.

[21] Appl. No.: 154,082

[22] Filed: Feb. 9, 1988

[51] Int. Cl.[4] .............................................. A23L 1/18
[52] U.S. Cl. ............................. 99/323.5; 219/10.55 E; 220/20; 220/70; 220/306
[58] Field of Search ................ 99/323.4, 323.5, 323.8; 219/10.55 E; 220/20, 70; 150/55

[56] References Cited

U.S. PATENT DOCUMENTS

| D. 255,533 | 6/1980 | Lange et al. | |
|---|---|---|---|
| 2,078,719 | 4/1937 | Roach | |
| 2,480,679 | 8/1949 | Spencer | |
| 2,835,280 | 5/1958 | Miers | |
| 2,922,355 | 1/1960 | Green | |
| 3,973,045 | 8/1976 | Brandberg et al. | |
| 4,156,806 | 5/1979 | Teich et al. | |
| 4,158,760 | 6/1979 | Bowen et al. | |
| 4,166,208 | 8/1979 | Martel et al. | |
| 4,435,628 | 3/1984 | Bowen et al. | |
| 4,477,705 | 10/1984 | Danley | 99/323.5 |
| 4,532,397 | 7/1985 | McClelland | 99/323.5 |
| 4,563,561 | 1/1986 | Vaeth | 99/323.5 |

FOREIGN PATENT DOCUMENTS 54-88760  2/1981  Japan .
54-92596  2/1981  Japan .

Primary Examiner—Robert W. Jenkins
Attorney, Agent, or Firm—Neuman, Williams, Anderson & Olson

[57] ABSTRACT

A popcorn popper is provided for use in a microwave oven. The popper includes a bowl-like receptacle, and a cover therefor removably mounted on the upper end of the receptacle. Both the receptacle and cover are formed of a material which is transparent to microwave energy. The receptacle is provided with a bottom section and an upright wall section. The bottom section includes an interior first surface area which tapers downwardly and inwardly from a lower portion of the wall section, and an interior second surface area which is spaced inwardly from the wall section. The second surface area has a recessed trough-like configuration with at least one elongated narrow base portion, diverging side walls extending upwardly from opposite side edges of the base portion and at least one inclined end wall which extends upwardly and outwardly from the base portion towards the wall section. When a predetermined amount of unpopped popcorn kernels is initially deposited in the receptacle, the kernels thereof will be accommodated in and uniformly distributed throughout the second surface area and form an elongated strip-like formation having a relatively narrow cross-section. A substantial number of kernels defining an upper surface of the formation and in direct contact with the side and end walls are readily exposed to the rays of microwave energy generated in the microwave oven and thus, quickly reach popping temperature.

5 Claims, 1 Drawing Sheet

U.S. Patent  Apr. 25, 1989  4,823,683
FIG. 1
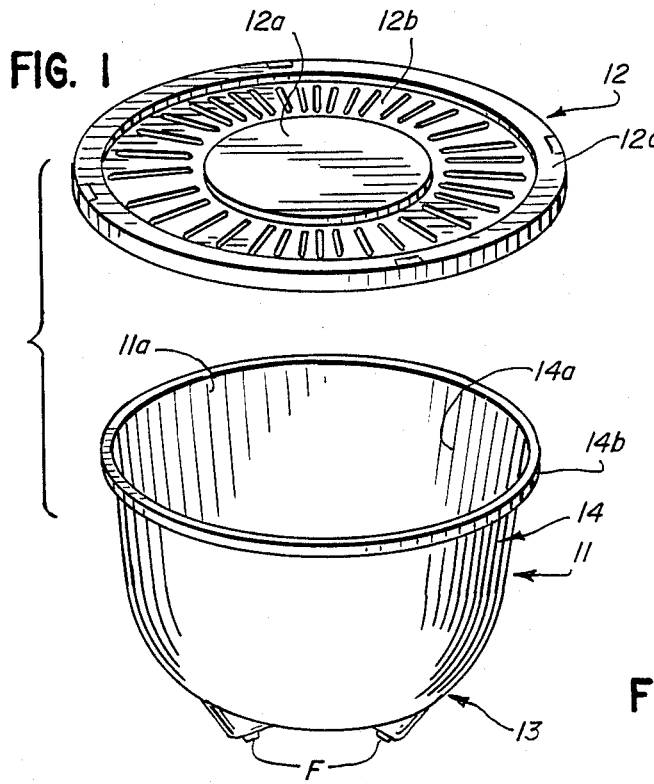
FIG. 3
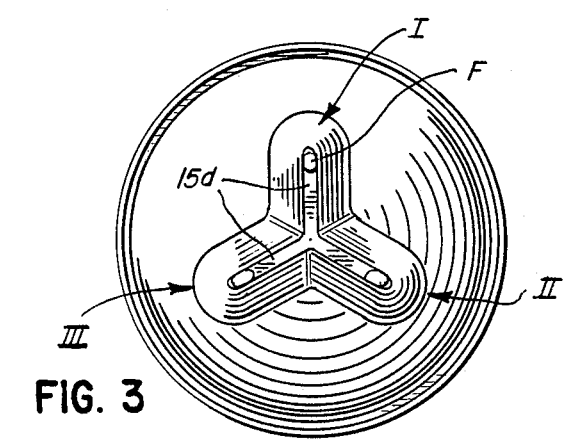
FIG. 6
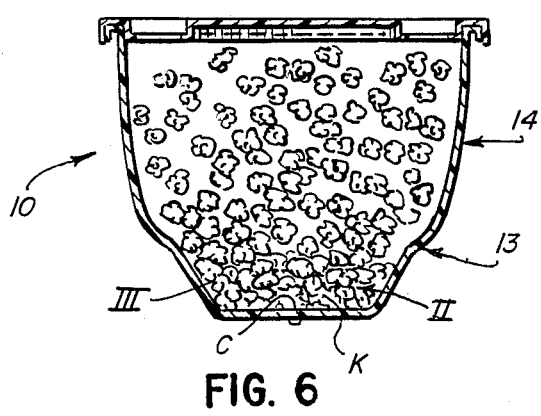
FIG. 7
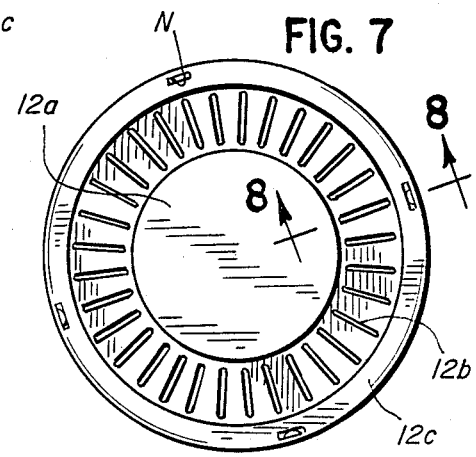
FIG. 2
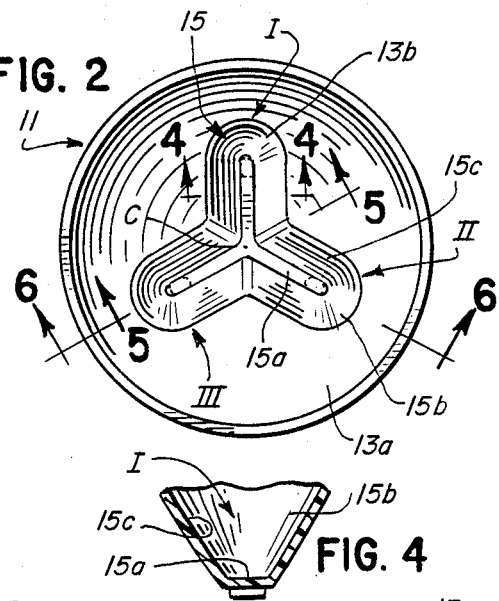
FIG. 4
FIG. 5
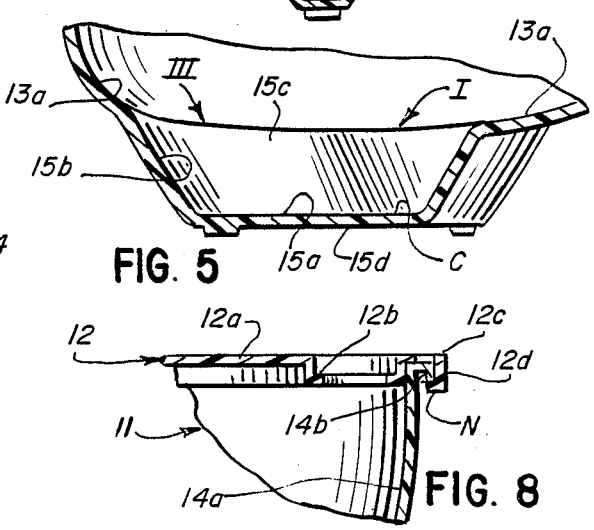
FIG. 8
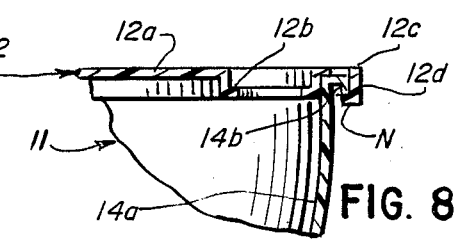

POPCORN POPPER

BACKGROUND OF THE INVENTION

Various popcorn poppers of the reusable type for use in a microwave oven have heretofore been available; however, because of certain inherent design features, they are beset with one or more of the following shortcomings; (a) a substantial volume of the kernels remain unpopped due to the kernels being initially disposed in a small compact clump at the bottom of the popper; (b) an inordinate amount of microwave energy is required in order to attain a high percentage of popped kernels; (c) the popper is not self-supporting but requires a separate bracket or frame to support the popper within the microwave oven; (d) where the kernels are initially confined to a small compact area at the bottom of the popper, unpopped kernels expelled from such an area, when the popper is being exposed to microwave energy, are oftentimes blocked by the popped kernels from returning to the small compact area; and (e) they are of bulky, complex and costly construction and difficult to clean.

SUMMARY OF THE INVENTION

Thus, it is an object of the invention to provide an improved popper which avoids all of the aforementioned shortcomings.

It is a further object to provide a popper which is of simple, sturdy construction, attractive in appearance and is dishwasher safe.

It is a still further object to provide a popper in which a predetermined volume of unpopped kernels initially disposed within the popper have the kernels thereof arranged in elongated strip-like formations wherein a large number of the arranged kernels are directly exposed to rays of microwave energy generated within the oven.

Further and additional objects will appear from the description, acompanying drawing and appended claims.

In accordance with one embodiment of the invention an improved popcorn popper is provided which includes a receptacle formed of a relatively stiff material transparent to microwave energy and a cover therefor for retaining popped and unpopped popcorn kernels within the receptacle when the latter is subjected to microwave energy. The receptacle includes a bottom section onto which a predetermined volume of unpopped popcorn kernels is initially deposited, and an upstanding wall section delimiting said bottom section. The bottom sectoin has a downwardly and inwardly tapered interior first surface area integral with a lower portion of the upstanding wall section and an interior second surface area integral with the first surface area and spaced inwardly from the upstanding wall section. The second surface area is provided with a trough-like segment recessed relative to the first surface area in which the predetermined volume of unpopped kernels has the kernels thereof arranged in at least one elongated, relatively narrow strip-like formation.

DESCRIPTION

For a more complete understanding of the invention reference is made to the drawing wherein:

FIG. 1 is a perspective side view of a preferred embodiment of the improved popper showing the components thereof in exploded relation.

FIG. 2 is a top plan view of the receptacle of FIG. 1 per se and showing the interior thereof.

FIG. 3 is a bottom view of the receptacle of FIG. 2

FIGS. 4 and 5 are enlarged fragmentary sectional views taken along lines 4-4 and 5-5 respectively of FIG. 2.

FIG. 6 is a vertical sectional view taken along line 6-6 of FIG. 2 and showing the receptacle and cover therefor in assembled relation and showing popped and unpopped kernels retained within the receptacle.

FIG. 7 is a top plan view of cover shown assembled on the upper end of the receptacle.

FIG. 8 is an enlarged fragmentary sectional view taken along line 8-8 of FIG. 7.

Referring now to the drawing and more particularly to FIGS. 1 and 6, a preferred embodiment of the improved popcorn popper 10 is shown which is particular suitable for use in a conventional domestic type microwave oven (e.g. effective wattage of at least 600), not shown, and without the need for the unpopped popcorn kernels being in contact with a suitable heated cooking oil or butter. Popper 10 is provided with a receptacle 11 having a bowl-like configuration, formed of a relatively stiff plastic material transparent to microwave energy and able to withstand repeated washings in conventional dishwashers. The receptacle may be wholly or partially transparent, if desired, so that the popped kernels can be observed. A perforated lid or cover 12 is removably mounted on the open upper end 11a of the receptacle. The cover is preferably formed of a plastic material transparent to microwave energy and of less-stiffness than the receptacle material.

The receptacle 11 is of unitary construction and includes a bottom section 13 and an upstanding wall section 14, which delimits the bottom section. The wall section 14 may have an interior surface 14a which has a frusto-conical, frusto-pyramidal, cylindrical, or rounded configuration.

The bottom section, as seen in FIGS. 2 and 6, includes an interior first surface area 13a, which encompasses an interior second surface area 13b. The first surface area 13a tapers downwardly and inwardly from the lower portion of the wall section 14 towards the second surface area 13b. The term "tapers" as used herein is intended to include frusto-conical, semi-circular, hyperbolic, frusto-pyramidal or rounded surface configurations. The juncture between the first surface area and the lower portion of the wall section is smooth and unobstructed so that unpopped kernels which have been expelled upwardly into the upper portion of the receptacle, when the receptacle is exposed to microwave energy, will readily fall back into the second surface area 13b.

As seen in FIGS. 2, 4 and 5, the second surface area is provided with a recessed, centrally disposed, trough-like formation 15, which in the illustrated embodiment includes three symmetrically arranged radiating segments I, II and III. Each segment is of like configuration and includes an elongated, narrow base portion 15a. One end of the base portion terminates at approximately the center C of the bottom section 13 and is in communication with the corresponding ends of the other segments. The opposite end of the base portion terminates at an end wall 15b, the latter extending upwardly and outwardly towards the wall section 14. Besides the end wall 15b, each segment is provided with upwardly diverging side walls 15c which are integral with the elongated side edges of the base portion 15a. The slope (e.g. approximately 45°) of the side walls 15c and end wall 15b relative to the base portion 15a and the narrowness (e.g. approximately ¼") and length (e.g. approximately 2") of the base portion 15a causes a predetermined volume (e.g. approximately ½ cup) of kernels K to be distributed substantially uniformly throughout each elongated strip-like segment. The overall length (e.g. approximately 2⅜") of each segment when measured at the upper open end thereof is substantially greater than the overall width (e.g. approximately ¾") thus, resulting in the unpopped kernels accommodated in each segment forming an elongated mass of relatively narrow cross-section.

By reason of the strip-like segments I, II and III, a substantial amount of the kernels form the upper surface of each segment and likewise a substantial amount of kernels are in direct contact with the side and end walls which are of a material transparent to microwave energy and quickly (e.g. 3–5 minutes) reach a popping energy and thus, are more readily exposed to the microwave temperature. As the kernels on the upper surface pop they will be expelled into the upper portion of the receptacle, wherein the volume thereof is substantially greater than the volume of the bottom section.

In addition, many of the kernels beneath the upper surfaces and in contact with the side and end walls will quickly be ome sufficiently hot, so as to pop. As these lower kernels pop certain of the unpopped kernels are expelled up into the upper portion of the receptacle and once they drop back down onto the bottom section the configuration of the interior first surface area will automatically cause the unpoppd kernels to find their way back to one of the strip-like segments. The number, length and size of the segments may vary from that shown if desired; provided the unpopped kernels are spread out and substantially uniformly distributed throughout the segment so as to form at least one elongated mass having a relatively narrow cross-section.

The upper open end of receptacle 11 is delimited by an outwardly and downwardly extending flange 14b. The flange serves a dual function: (a) it reinforces the open end of the receptacle; and (b) it serves as a means for interlockingly engaging the periphery of a removable cover or lid 12, see FIG. 8.

The cover 12 is preferably formed of a suitable plastic material which is less rigid than the receptacle and is transparent to microwave energy. The peripheral shape of the cover 12 will correspond to the periphery of flange 14b. In the illustrated embodiment of the cover 12, it is substantially disc-shape and includes a relatively flat center portion 12a, a perforated intermediate portion 12b, and a rim portion 12c. The rim portion 12c includes a depending flange 12d. At predetermined locations along depending flange 12d there are provided inwardly projecting nubs N which are adapted to subtend and resiliently engage the underside of the receptacle flange 14b and lockingly assemble the cover onto the upper end of the receptacle. The configuration of the cover 12 may vary over a wide range and will depend upon the shape of the receptacle upper end portion and the size of the cooking chamber of the microwave oven.

The rim portion 12c of the cover should be manually distortable so as to allow the nubs N to become disengaged from the flange 14b when the cover is to be removed for cleaning or loading or unloading of the receptacle.

As seen in FIGS. 3–5, the exterior of the trough-like formation 15 projects downwardly from the underside of the first surface area of the bottom section and provides a relatively flat exterior supporting surface 15d. If desired, feet F may be formed on the surface 15d which are adapted to engage a bottom wall of the cooking chamber of the microwave oven. By reason of the flat exterior surface 15d, and/or the feet F the popper 10 is readily self-supporting.

Thus, an improved popper has been disclosed which is of simple, inexpensive, dishwasher-safe construction; allows the unpopped kernels to be initially spread out in an elongated strip-like formation; and when the loaded popper is subjected to microwave energy, any of the unpopped kernels expelled from the formation will automatically by the force of gravity return to the formation until it is popped.

I claim:

1. A popcorn popper for use in a microwave oven, comprising a receptacle of a relatively stiff material transparent to microwave energy, said receptacle including a bottom section and an integral upstanding wall section; and means overlying an upper end portion of the receptacle for retaining popped and unpopped popcorn kernels within the receptacle when the latter is exposed to microwave energy; said receptacle bottom section having a downwardly and inwardly tapered interior first surface area connected to a lower portion of the wall section and an interior second surface area integral with said first surface area and spaced inwardly from said wall section, said second surface area being provided with trough-like means having a substantially uniform width and length greater than width for initially accommodating a predetermined volume of unpopped kernels and arranging same in at least one elongated relatively narrow strip-like formation.

2. The popper of claim 1 wherein the trough-like means includes a plurality of elongated segments extending substantially radially from a substantially centrally disposed location in the bottom section and terminating proximate the lower portion of the wall section.

3. The popper of claim 1 wherein the means for retaining popped and unpopped popcorn kernels within the receptacle includes a perforated lid removably mounted on the receptacle upper end portion; said lid being formed of a material transparent to microwave energy.

4. A popcorn popper for use in a microwave oven, comprising a receptacle of a relatively stiff material transparent to microwave energy, said receptacle including a bottom section and an upstanding wall section; and means overlying an upper end portion of the receptacle for retaining popped and unpopped popcorn kernels within the receptacle when the latter is exposed to microwve energy; said receptacle bottom section having a downwardly and inwardly tapered interior first surface area connected to a lower portion of the wall section and an interior second surface area integral with said first surface area and spaced inwardly from said wall section, said second surface area being provided with a trough-like means having substantially greater length than width for initially accommodating apredetermined volume of unpopped kernels and arranging same in at least one elongated relatively narrow strip-like formation; said trough-like means including an elongated narrow base portion to subtend and supportingly engage a plurality of unpopped kernels, and upwardly directing side and end walls, the latter having upper end edges integral with said interior first surface.

5. The popper of claim 4 wherein the trough-like means includes a plurality of interconnected elongated segments extending from a substantially centrally disposed location in the bottom towards the wall section, each segment having a narrow base portion; the base portions of said segments being in substantially coplanar relation.

* * * * *

UNITED STATES PATENT AND TRADEMARK OFFICE
CERTIFICATE OF CORRECTION

PATENT NO. : 4,823,683

DATED : April 25, 1989

INVENTOR(S) : Edward H. Meisner

It is certified that error appears in the above-identified patent and that said Letters Patent is hereby corrected as shown below:

Column 1, line 55, "sectoin" should be --section--.

Column 3, lines 22-24, cancel "and quickly (e.g. 3-5 minutes) reach a popping energy and thus are more readily exposed to the microwave" and substitute therefor --and thus, are more readily exposed to the microwave engergy and quickly (e.g. 3-5 minutes) reach a popping--.

Column 3, line 30, "be ome" should be --becomes--.

Column 4, line 65, "apredetermined" should be --a predetermined--.

Signed and Sealed this

Fifth Day of December, 1989

Attest:

JEFFREY M. SAMUELS

Attesting Officer    Acting Commissioner of Patents and Trademarks